J. H. IRWIN.
ANIMAL-TRAPS.
No. 195,133.　　　　　Patented Sept. 11, 1877.
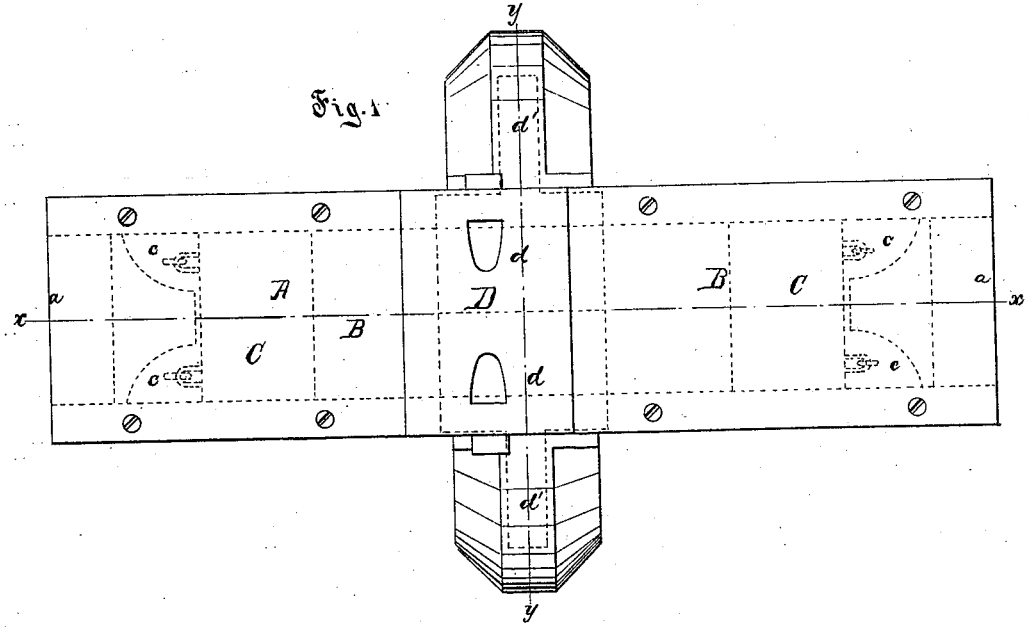
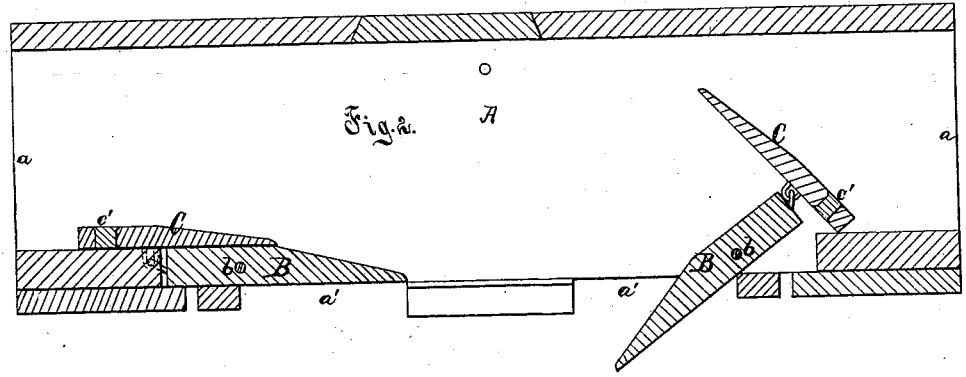
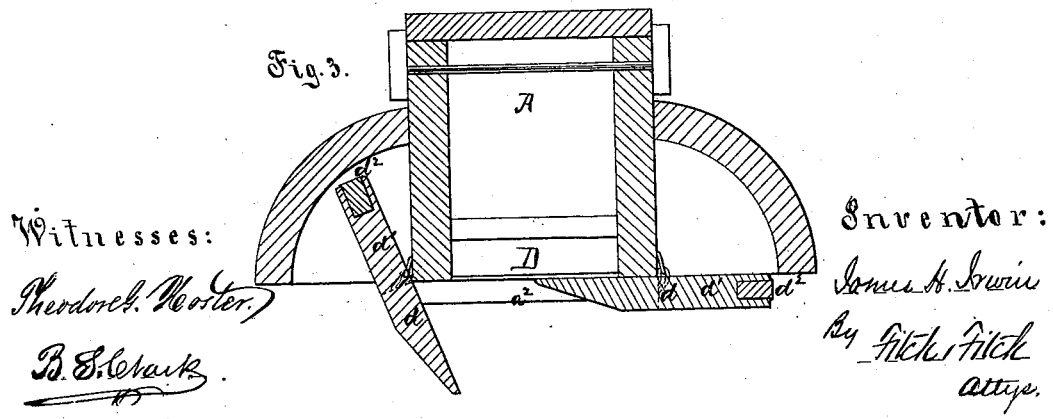
Witnesses:
Theodore J. Wooster
B. S. Clark
Inventor:
James H. Irwin
By Fitch & Fitch
Attys.

UNITED STATES PATENT OFFICE.

JAMES H. IRWIN, OF CORNELIA, MISSOURI.

IMPROVEMENT IN ANIMAL-TRAPS.

Specification forming part of Letters Patent No. 195,133, dated September 11, 1877; application filed July 10, 1877.

*To all whom it may concern:*

Be it known that I, JAMES H. IRWIN, of Cornelia Post-Office, county of Johnson, in the State of Missouri, am the inventor of an Improved Trap for Small Animals, of which the following is a full, clear, and exact description, reference being had to the accompanying drawings, forming part of this specification.

My invention relates to a trap device for catching small animals, such as rats and mice; and it consists in a tubular box or case, open at both ends, having near the entrance at each end, in the floor, a downwardly-swinging door, to which is hinged a gate that is arranged to swing upward and close the entrance behind the animal, and having between said downwardly-swinging doors another pair of downwardly-swinging doors in the floor of the case, all arranged to operate as hereinafter particularly described, and as more at length recited in the claim.

Figure 1 is a plan of a trap embodying my invention. Fig. 2 is a longitudinal vertical sectional view of the same. Fig. 3 is a cross-section of the same.

A is the tube or box forming the body of the trap. This has the open ends $a$, which constitute the entrances or ports for the animals. Upon either end of the box A, in the floor thereof, which is cut away at these places to form exit-ports, as at $a^1$, are hung the doors or drops B. These drops are pivoted at $b$, so their inner ends will, when weight is imposed on them, fall or swing downwardly through the ports $a^1$. Upon the opposite or outer end of these drops are hinged the gates C. These gates, when the drops to which they are attached are at rest, are arranged to lie over and upon the outer ends of the drops, and extend outwardly upon the floor of the case, as seen at the left-hand end of Fig. 2.

The floor is recessed at $c$ to permit the play of the hinges, and to allow the gates to rest upon the surface of the floor in a level position. The outer end of each gate C is weighted at $c'$, so that, when the drop B falls, and the outer end thereof is thereby raised above the floor, the weighted outer end of the gate C will remain contiguous to the floor, while its inner end will, by the movement of the drop, be carried upward to and against the roof of the case, thus acting to close the entrance-port, as seen at the right hand of Fig. 2. The drops B are arranged to swing in the line of the length of the box or case A.

Between the extremities of the inner ends of the drops B is hung the double drop or fall D. This consists of the two doors $d$, one of which is pivoted or hinged to each side of the case in the floor, which is cut away to form a port, $a^2$, the said doors meeting in the center, and being arranged to swing laterally in the case. Each door has an arm, $d^1$, which is weighted at its end at $d^2$, as shown. When a weight is imposed on the doors $d$ they will fall or swing downwardly, when, the weight being dropped, the arms $d^1$ will carry the doors back to close the opening.

The operation of my trap is obvious. A rat entering either port $a$ steps on a drop, B, which falls, the gate C closing the port behind the rat. If this does not precipitate the rat through the opening $a^1$, and the rat seeks to cross the trap to the opposite end, when it steps on the fall D, it will at once be precipitated through the opening $a^2$.

It is intended to use this trap in connection with a water-butt, or other suitable receptacle, into which the rats can be dropped.

What I claim as my invention, and desire to secure by Letters Patent, is—

The case A, having open ends $a$, drops B in openings $a^1$, and having the weighted gates C, together with the intermediate weighted fall D in the opening $a^2$, arranged to operate as and for the purpose specified.

JAMES H. IRWIN.

Witnesses:
JOHN J. COCKRELL,
WM. P. ASBURY.